(12) United States Patent
Fasen

(10) Patent No.: US 7,333,291 B1
(45) Date of Patent: Feb. 19, 2008

(54) SYSTEM AND METHOD FOR REDUCING TRACKING NOISE IN A TAPE DRIVE

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/529,095

(22) Filed: Sep. 28, 2006

(51) Int. Cl.
G11B 5/584 (2006.01)

(52) U.S. Cl. .................................... 360/77.12

(58) Field of Classification Search ............. 360/77.12, 360/77.01, 77.05, 77, 51, 73.04, 53, 75, 137, 360/60
See application file for complete search history.

(56) References Cited

U.S. PATENT DOCUMENTS

| | | | |
|---|---|---|---|
| 4,700,244 A | 10/1987 | Fasen | |
| 5,041,926 A | 8/1991 | Ockerse et al. | |
| 5,409,204 A * | 4/1995 | Strohmeyer et al. | 271/3.12 |
| 5,617,269 A * | 4/1997 | Gordenker et al. | 360/77.12 |
| 5,939,707 A | 8/1999 | Fasen | |
| 5,982,711 A | 11/1999 | Knowles et al. | |
| 5,995,315 A | 11/1999 | Fasen | |
| 5,999,359 A | 12/1999 | Fasen | |
| 6,031,673 A | 2/2000 | Fasen | |
| 6,111,719 A | 8/2000 | Fasen | |
| 6,122,124 A | 9/2000 | Fasen | |
| 6,124,996 A | 9/2000 | Fasen | |
| 6,169,640 B1 | 1/2001 | Fasen | |
| 6,172,837 B1 | 1/2001 | Fasen | |
| 6,411,460 B1 | 6/2002 | Fasen | |
| 6,504,385 B2 | 1/2003 | Hartwell et al. | |
| 6,542,325 B1 * | 4/2003 | Molstad et al. | 360/77.12 |
| 6,563,659 B1 | 5/2003 | Fasen | |
| 6,600,616 B2 | 7/2003 | McAllister et al. | |
| 6,762,900 B2 | 7/2004 | Bui et al. | |
| 6,775,223 B2 | 8/2004 | Eldredge et al. | |
| 6,842,305 B2 * | 1/2005 | Molstad et al. | 360/77.12 |
| 6,900,964 B2 | 5/2005 | Argumedo et al. | |
| 6,911,792 B2 | 6/2005 | Fasen | |
| 6,970,311 B2 | 11/2005 | Jaquette et al. | |
| 6,980,398 B2 | 12/2005 | Bengds et al. | |
| 6,996,051 B2 | 2/2006 | Ives et al. | |
| 2003/0016466 A1 | 1/2003 | Bui et al. | |
| 2004/0194802 A1 | 10/2004 | Bengds et al. | |
| 2004/0255091 A1 | 12/2004 | Justo et al. | |
| 2005/0111131 A1 | 5/2005 | Anderson et al. | |
| 2006/0018053 A1 | 1/2006 | Ives et al. | |

OTHER PUBLICATIONS

Linear Tape-Open, About the Technology: White Papers, Hewlett-Packard, IBM and Quantum, 1999-2006, found at http://www.lto.org/newsite/html/about_white2.html.

* cited by examiner

Primary Examiner—Fred F. Tzeng
(74) Attorney, Agent, or Firm—Fletcher Yoder

(57) ABSTRACT

There is provided a system and a method for reducing noise in a tape drive. More specifically, in accordance with one embodiment, there is provided a method of writing servo stripes comprising energizing a left servo gap while not energizing a right servo gap; energizing the left servo gap and the right servo gap at the same time, and energizing the right servo gap while not energizing the left servo gap.

20 Claims, 5 Drawing Sheets

SYSTEM AND METHOD FOR REDUCING TRACKING NOISE IN A TAPE DRIVE

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

The loss of computer data can be a serious threat to any business. Backing up computer data is one technique for providing some measure of protection against data loss. One technique for backing up data is to record the data onto magnetic tapes. For example, a magnetic tape configured to operate under the Linear-Tape Open ("LTO") standard may be used to back-up the data. Under the LTO standard, data is recorded on and read from a moving magnetic tape with an electromagnetic read/write head positioned next to the magnetic tape. Elements within the electromagnetic head are then selectively activated by electric currents which create magnetic flux patterns representing the data on the magnetic tape. The data can then be read from the magnetic tape by moving the electromagnetic tape past the electromagnetic head elements again. In particular, the magnetic flux patterns recorded on the magnetic tape will create electric signals in the electromagnetic head elements, which can be read as the data.

LTO magnetic tapes typically have at least two sections. A first section where the data itself is stored, and a second section that is used to determine the position of the magnetic tape during reading. This second section may contain one or more servo stripes that are tracked by the tape drive to determine the position of the magnetic tape. These servo stripes are recorded on the tape in a repeating pattern during a servo writing process that typically accompanies the manufacture of the magnetic tape. For example, a typical repeating servo stripe pattern includes five right slope (+6 degrees from a direction orthogonal to the direction of the tape's movement) servo stripes, then five left slope (−6 degrees from a direction orthogonal to the direction of the tape's movement) servo stripes, then four right slope servo stripes, then four left slope servo stripes. The position of a head element relative to the tape may be calculated by comparing the time between the first of the five right slope servo stripes and the first of the five left slope servo stripes (referred to as "P time") with the time between the first of the five right slope servo stripes and the first of the four right slope servo stripes (referred to as "S time").

In conventional tape servo-write heads, a single coil creates the right slope and left slope servo stripes. This results in servo bands where the P space is fixed or independent of tape speed because it is based on the fixed space between the two stripe writing gaps. In contrast, the S space is variable because it is written at different times and is thus dependent on tape speed and write current timing. Small variations in tape speed during servo writing can be difficult to avoid and can result in a frequency modulation ("FM") of the S stripes. The presence of this written-in FM in the S stripes may result in position signal noise when the P times are normalized by (e.g., divided by) the S times as position=P time divided by S time This position signal noise can degrade the tracking accuracy of the conventional tape drives.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, Linear Tape Open ("LTO") magnetic tape drives use a repeating servo stripe pattern to determine the position of a magnetic tape during tape reads. In one embodiment, this pattern includes five right slope (+6 degrees from a direction orthogonal to the direction of the tape's movement) servo stripes, then five left slope (−6 degrees from a direction orthogonal to the direction of the tape's movement) servo stripes, then four right slope servo stripes, then four left slope servo stripes, and then repeating in that manner. The position of a head element relative to the tape may be calculated by comparing the time between the first of the five right slope servo stripes and the first of the five left slope servo stripes (referred to as "P time") with the time between the first of the five right slope servo stripes and the first of the four right slope servo stripes (referred to as "S time"). Specifically, position may be based on the ratio of P time to S time (Position=P_time/S_time).

Small variations in tape speed during servo writing can be difficult to avoid and will result in a frequency modulation (FM) of the S stripes. The presence of written-in FM in the S stripes will result in position signal noise when the P times are normalized by (e.g., divided by) the S times This position signal noise degrades the tracking accuracy of the tape drive using a conventionally servo written tape.

Accordingly, one or more of the embodiments set forth below may be directed towards a system or method for reducing tracking noise in a tape drive. More specifically, in one embodiment, there is provided a tape servo writer including a servo write head that has two separately energizable coils. Because the coils are separately energizable, instabilities in tape speed can affect both the P times and the S times. However, because the position calculation for the tape drive is calculated as a ratio of P time to S time (P_time/S_time), noise introduced by instabilities in tape speed can be cancelled out, which results in less tape tracking error.

Figure 1:
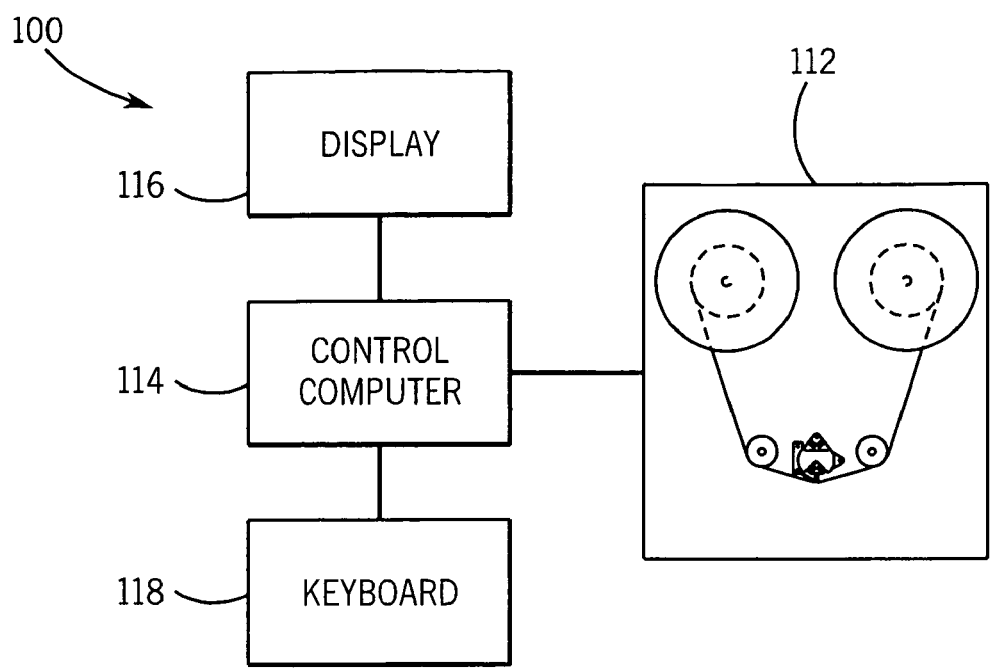
FIG. 1 is a block diagram of an exemplary servo writing system in accordance with one embodiment of the present invention.

Turning now to FIG. 1, a block diagram of an exemplary servo writing system in accordance with one embodiment is illustrated and generally designated by a reference numeral 100. However, it will be appreciated that other embodiments of a servo writing system using LTO magnetic tape drives fall within the scope of the presently disclosed techniques. As illustrated, the system 100 may include a servo writing machine 112. As will be described in greater detail with regard to FIGS. 2-6, the servo writing machine 112 may be configured to create patterns of servo stripes in the servo bands of a magnetic tape in order to enable positional tracking when the magnetic tapes are later employed.

As illustrated, the servo writing system 100 may also include a control computer 114. As will be appreciated, the control computer 114 may be configured to control the operation of the servo writing machine 112. For example, an operator may use the control computer 114 to control the operation of the servo writing machine 112. Towards this end, the servo writing system 100 may also include a display 116 and a keyboard 118 to allow the operator to interact with the servo writing machine 112.

Figure 2:
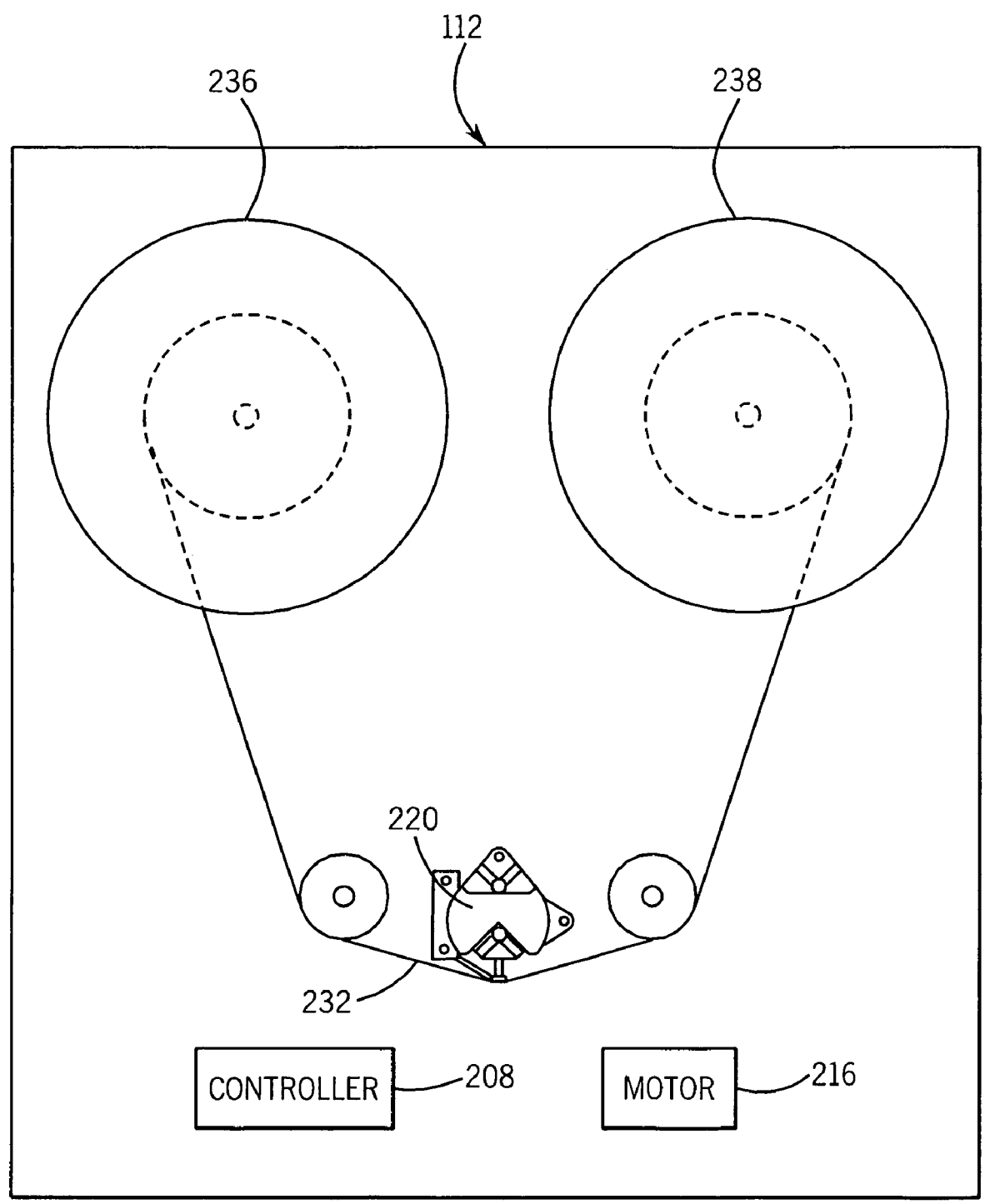
FIG. 2 is a block diagram of an exemplary servo writing machine in accordance with one embodiment of the present invention.

Turning next to FIG. 2, a more detailed diagram of the exemplary servo writing machine 112 in accordance with one embodiment is illustrated. The motor 216 operates to move magnetic tape 232 from a source reel 236 past the servo write heads 220 and around a take-up reel 238. As will be described in more detail below, in one embodiment, the servo write heads 220 may include two separately energizable coils.

The servo write heads 220 may be coupled to a controller 208, which may be hardware, software, or a combination or hardware and software. The controller 208 may be configured to direct the servo write heads 220 to write position stripes ("P stripes") and speed stripes ("S stripes") onto the magnetic tape 232. As described in more detail below, the controller 208 may be configured to direct the two separately energizable coils of the servo write heads 220 to energize either by themselves or in combination with each other.

Figure 3:
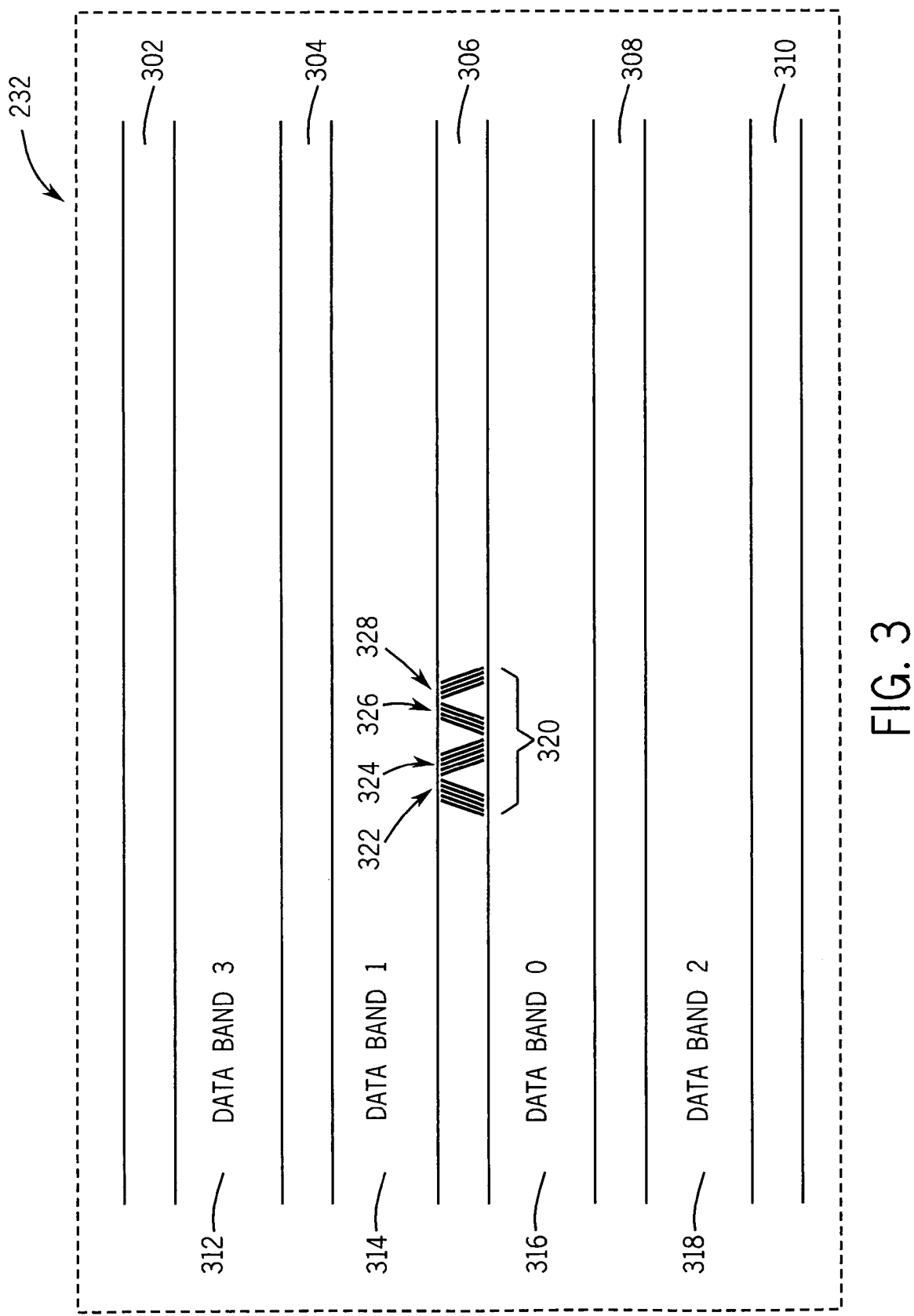
FIG. 3 is a diagram of an exemplary magnetic tape in accordance with one embodiment of the present invention.

FIG. 3 is a more detailed view of the magnetic tape 232 in accordance with one embodiment. As illustrated, the magnetic tape 232 is split into four separate data bands 312, 314, 316, and 318 ("312-318") into which data from computer system 100 may be written. Each data band 312-318 is bordered on each side by servo bands 302, 304, 306, 308, and 310 ("302-310"). In one embodiment, the servo bands 302-310 are each approximately 200 µm in width and may enable the tape head 224 to monitor its position relative to the servo bands 302-310, and so, in effect, to monitor the position of the writing elements relative to the centers of the tracks during write operations.

Further, as described above, servo stripe patterns recorded on the servo bands 302-310 enable a tape drive to determine the relative head-tape position during data accesses. Each of the servo bands 302-310 contains a pattern 320 of magnetic stripes, which are written by servo write heads 220. As illustrated, the pattern 320 is written onto the servo bands 302-310 in two sets 322 and 324 of five stripes followed by two sets 326 and 328 of four stripes. The pattern 320 of magnetic stripes may be repeated along each servo band 302-310 for the entire length of the magnetic tape.

As shown in FIG. 3, the pattern 320 may include the stripe sets 322, 324, 326, and 328. In one embodiment, the stripe set 322 may include five stripes with a right leaning slope of approximately 6 degrees from a direction orthogonal to the direction of the magnetic tape's 232 movement, and the stripe set 324 may include five stripes with left leaning stripes of approximately −6 degrees from a direction orthogonal to the direction of the magnetic tape's 232 movement. Similarly, the stripe set 326 may include four right leaning stripes, and the stripe set 328 may include four left leaning stripes. It will be appreciated, however, that the five, five, four, four pattern is merely one possible stripe pattern 320. As such, in alternate embodiments, other suitable stripe patterns may be employed. Moreover, in still other embodiments, the stripe sets 322, 324, 326, and 328 may be angled at other suitable slopes or not angled.

Figure 4:
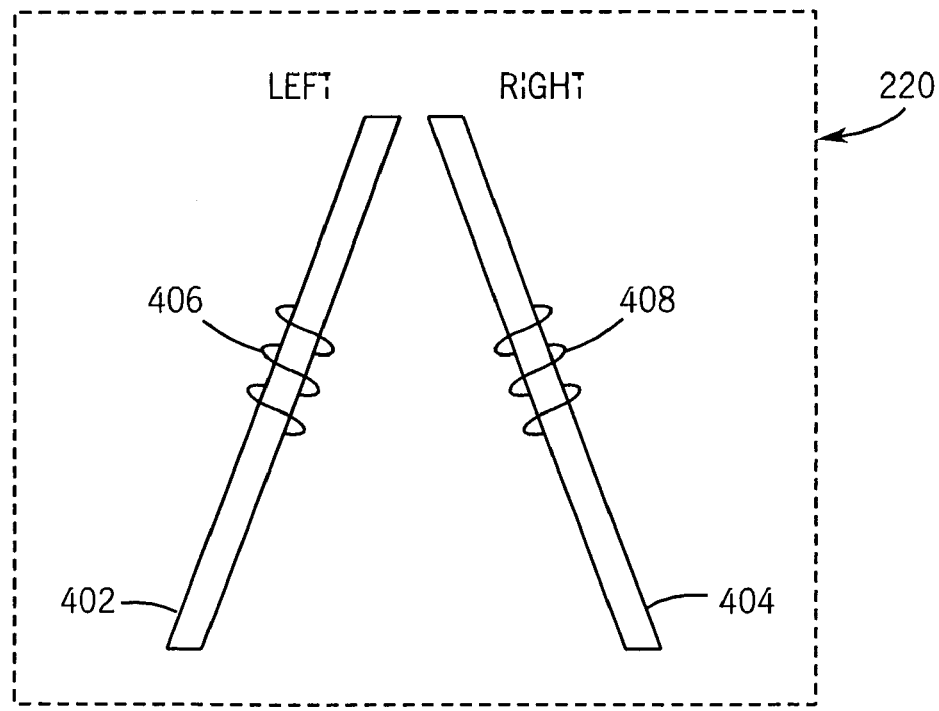
FIG. 4 is a diagram of an exemplary servo write head in accordance with one embodiment of the present invention.

Turning next to FIG. 4, a more detailed diagram of the servo write head 220 in accordance with one embodiment is illustrated. As shown, the servo write head 220 may include two servo head gaps: a left gap 402 and a right gap 404. The servo head gaps 402 and 404 may be configured to write the stripes 320 onto magnetic tape 232. The gap 402 has a coil 406 wrapped around it. Similarly, the servo head gap 404 has coil 408 wrapped around it. In one embodiment, the leading edge to leading edge distance between the gaps 402 and 404 may be less than 11 um, for example, approximately 10 um. In this embodiment, the distance between the leading edges of the bottom of gaps 402 and 404 may be less then 51 um, for example, approximately 50.2 um. It will be appreciated, however, that other suitable gap configurations may be employed on the write head 220.

As mentioned above, the coils 406 and 408 are separately energizable. Thus, both of the gaps 402 and 404 may be separately energized and are, thus, able to write stripes separately on the magnetic tape 232. Advantageously, using two separately energizable coils (and gaps) may generate a stripe pattern 320 in which the tape speed variation is reflected in both the P time and the S time and, as such, a position signal largely free of speed variation noise can be calculated. Moreover, as discussed in more detailed below, because each of the servo head gaps 402 and 404 are separately energizable, the overall size of the servo write head 220 can be smaller than conventional embodiments where the gaps 402 and 404 have to be spread far enough apart to write both the left and right stripes at the same time.

Figure 5:
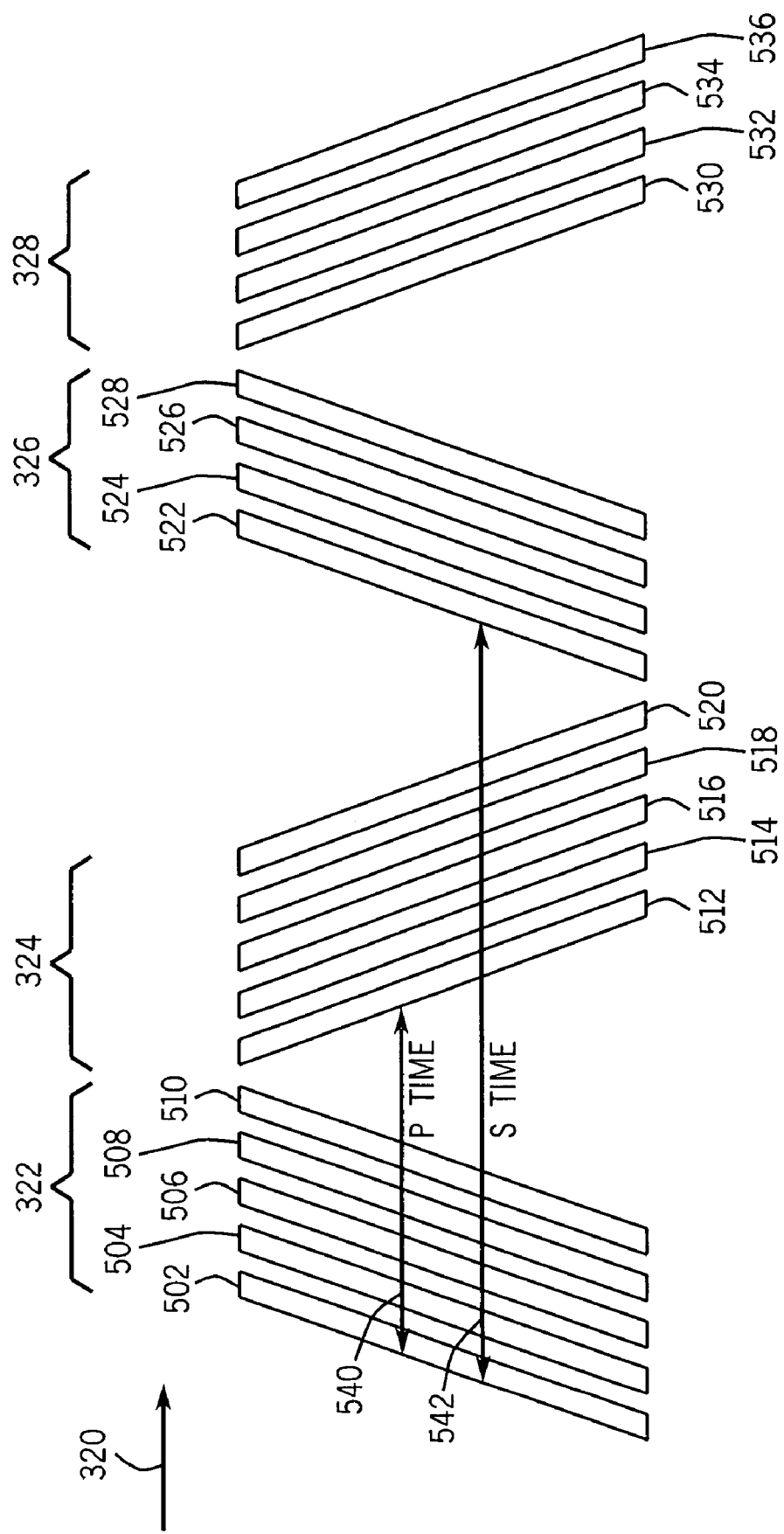
FIG. 5 is a diagram of a magnetic pattern in accordance with one embodiment of the present invention.
Figure 6:
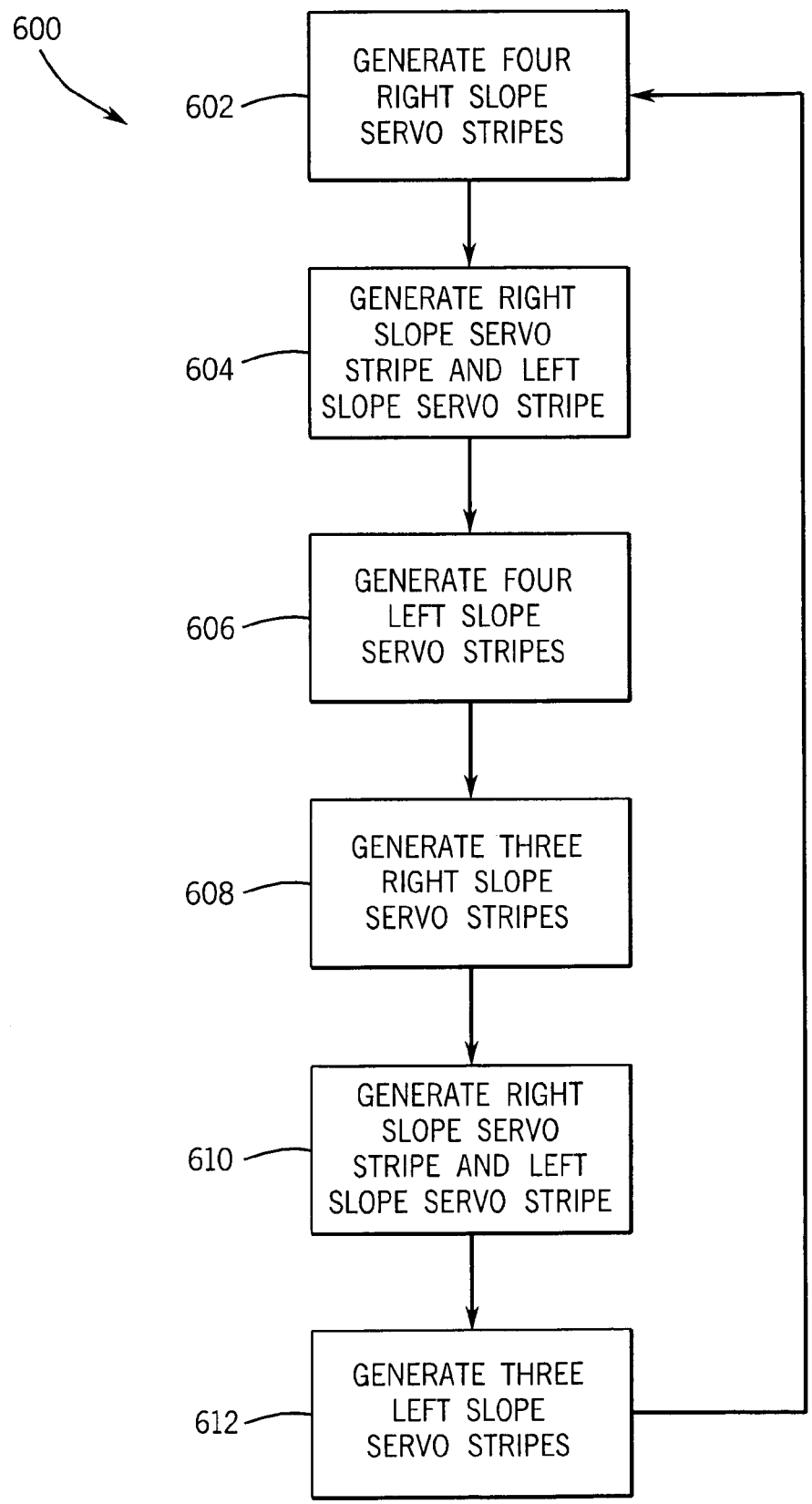
FIG. 6 is a flow chart illustrating an exemplary technique for creating servo stripes onto a magnetic tape of the present invention.

Turning next to FIG. 5, a more detailed diagram of the stripe pattern 320 in accordance with one embodiment is illustrated. As described above, the stripe sets 322, 324, 326, and 328 are written to the servo bands 302-310 in the magnetic tape 232. As described above, in one embodiment, the servo head gaps 402 and 404 are energized separately and send current pulses to create stripe sets 322-328 to the magnetic tape 232. For example, FIG. 6 is a flow chart illustrating an exemplary technique 600 for creating the stripe sets 322-328 in accordance with one embodiment. In this embodiment, the controller 208 (see FIG. 2) may be configured to store and/or execute code that performs the technique 600. For example, in one embodiment, the controller 208 may include a computer readable medium (i.e., memory, ASIC, and so forth) that stores instructions for affecting the technique 600.

For ease of description, the technique 600 will be described in conjunction with FIG. 5. It will be appreciated, however, that in alternate embodiments, other suitable tape drives may employ the technique 600. As illustrated by block 602 of FIG. 6, the technique 600 may begin with the left servo head gap 402 generating four right slope stripes 502, 504, 506, and 508 one after another on the magnetic tape 232. Next, the both of the servo head gaps 402 and 404 may energize at approximately the same time to generate stripes 510 and 512, as indicated by block 604. After this, the right servo head gap 404 may generate four left slope stripes 514, 516, 518, and 520, as indicated by block 606.

The second set of stripes 522-536 may then be created in similar manner, except that one less stripe is generated by each of the servo head gaps 402 and 404. In particular, the left servo head gap 402 generates the right slope stripes 522, 524, and 526 one after another on the magnetic tape 232, as indicated by block 608, and then both of the servo had gap 402 and 404 energize at approximately the same time to generate stripes 528 and 530, as indicated by block 610. Lastly, the right servo head gap 404 generates three left slope stripes 532, 534, and 536, as indicated by block 612. This technique may then be repeated until the servo bands of the magnetic tape are filled with servo stripes. This is far different than conventional tape servo-writers where the servo stripes 502 and 512 would be created at the same time, and as such, the P time is constant. Advantageously, creating the servo stripes 502 and 512, amongst others, at different times causes the servo stripes 502-536 upon which the "P time" and "S time" are based may be written in a manner that is equally affected by tape speed variation. Advantageously, this feature enables data to be read from the magnetic tape 232 in a more reliable, less noisy manner.

More specifically, as will be appreciated by those of ordinary skill in the art, the controller 208 (see FIG. 2) may be configured to calculate the position of the magnetic tape 232 as the ratio of the time between the stripes 502 and 512, the "P time" 240 and the time between the stripes 502 and 522, the "S time" 242. In other words, the position is calculated using a ratio of P/S. As discussed above, in conventional tape drives where the left and right servo head gaps 402 and 404 could only be energized together, the P time was constant (as it was a function of the physical spacing of the servo head gaps) while the S time would vary depending on the speed of the magnetic tape 232 while the stripes were being produced (as it was a function of head speed and tape speed. Advantageously, the separately energizable servo head gaps 402 and 404 result in P times and S times that both vary based on the speed of the magnetic tape. Accordingly, noise introduced by variations in the tape speed will affect both the P time and the S time and will, thus, cancel out of the ratio P/S.

For example, if the error caused by written-in FM causes an error $\epsilon$ in the measured S distance or time for the conventional, single-coil servo-write head, the resulting position signal is:

$$Pos = \frac{P}{S} = \frac{Pnom}{Snom+\varepsilon} = \frac{Pnom}{Snom \cdot \left(1+\frac{\varepsilon}{Snom}\right)} \approx \frac{Pnom}{Snom} \cdot \left(1-\frac{\varepsilon}{Snom}\right)$$

where Pnom is the nominal P value and Snom is the nominal S value. Notice, the error in the Position signal is largest when Pnom is maximum or when the reader elements are positioned at the bottom of the servo band. With the separate-gap servo-write head, the written-in FM causes an error $\epsilon$·Pnom/Snom in the measured P distance or time in addition to the error $\epsilon$ in the measured S distance or time. The resulting position signal is:

$$Pos = \frac{P}{S} = \frac{Pnom + \varepsilon \cdot Pnom/Snom}{Snom + \varepsilon} = \frac{Pnom \cdot (1+\varepsilon/Snom)}{Snom \cdot (1+\varepsilon/Snom)} = \frac{Pnom}{Snom}$$

which is the desired position signal with no written-in FM error terms.

While the invention described above may be susceptible to various modifications and alternative forms, specific embodiments have been shown by way of example in the drawings and have been described in detail herein. It should be understood, however, that the invention is not intended to be limited to the particular embodiments disclosed.

What is claimed is:

1. A method of writing servo stripes comprising:
    energizing a left servo gap while not energizing a right servo gap;
    energizing the left servo gap and the right servo gap at the same time; and
    energizing the right servo gap while not energizing the left servo gap.

2. The method, as set forth in claim 1, wherein the energized servo gaps write stripes to a magnetic tape.

3. The method, as set forth in claim 2, wherein the magnetic tape is in a linear tape-open format.

4. The method, as set forth in claim 2, wherein energizing the left servo gap comprises writing a stripe to the magnetic tape with an angle of approximately 6 degrees from a direction orthogonal to a direction of the magnetic tape's movement.

5. The method, as set forth in claim 1, wherein energizing the left servo gap comprises energizing a coil connected to the left servo gap.

6. The method, as set forth in claim 1, wherein energizing the left servo gap while not energizing the right servo gap comprises energizing the left servo gap three times without energizing the right servo gap.

7. A system comprising:
    a write head including:
        a first servo gap; and
        a second servo gap, wherein the first servo gap is configured to be energized separately from the second servo gap.

8. The system, as set forth in claim 7, wherein a tip to tip distance between the first and second servo gap is less than 11 um at a top and less than 51 um at the bottom.

9. The system, as set forth in claim 7, wherein the first and second servo gaps comprise a left servo gap and a right servo gap.

10. The system, as set forth in claim 9, comprising a controller coupled to the write head, the controller configured to instruct the write head to a send a current pulse to the right servo gap without sending a current pulse to the left servo gap.

11. The system as set forth in claim 9, comprising an interface configured to couple the controller to a computer.

12. The system, as set forth in claim 7, comprising a plurality of write heads.

13. A computer readable medium comprising:
    code adapted to energize a left servo gap while not energizing a right servo gap; and
    code adapted to energize the right servo gap while not energizing the left servo gap.

14. The computer readable medium, as set forth in claim 13, comprising code adapted to energize both the left servo gap and the right servo gap at substantially the same time.

15. The computer readable medium, as set forth in claim 13, wherein the code adapted to energize the left servo gap comprises code adapted to energize a coil wrapped around the left servo gap.

16. The computer readable medium, as set forth in claim 13, comprising code adapted to operate a write head to write servo stripes to magnetic tape.

17. The computer readable medium, as set forth in claim 16, wherein the code adapted to write servo stripes is adapted to write the servo stripes in a linear tape-open format.

18. The computer readable medium, as set forth in claim 13 wherein the code adapted to energize the right servo gap while not energizing the left servo gap comprises code adapted to energize the right servo gap four times without energizing the left servo gap.

19. The computer readable medium, as set forth in claim 13, wherein the tangible medium is a memory of a tape drive controller.

20. A magnetic tape comprising:
a servo band including:
a first set of servo stripes comprising a left most positive slope servo stripes and a left most negative slope servo stripe;
a second set of servo stripes comprising a left most positive slope servo stripes and a left most negative slope servo stripes, wherein a distance between the left most positive slope servo stripe and the left most negative slope servo stripe of the second set of servo stripes is different than a distance between the left most positive slope servo stripe and the left most negative slope servo stripe of the first set of servo stripes.

* * * * *